United States Patent [19]

Mathers et al.

[11] Patent Number: 4,957,554

[45] Date of Patent: Sep. 18, 1990

[54] DIMENSIONALLY-CONTROLLED CERAMICS

[75] Inventors: James P. Mathers, Woodbury, Minn.; Kathleen M. Humpal, River Falls, Wis.

[73] Assignee: Minnesota Mining and Manufacturing Company, St. Paul, Minn.

[21] Appl. No.: 394,574

[22] Filed: Aug. 16, 1989

[51] Int. Cl.$^5$ .............................................. C04B 35/18
[52] U.S. Cl. .................................... 106/35; 501/119; 501/39; 501/122; 501/121; 261/65; 433/199.1
[58] Field of Search .................... 264/65; 501/89, 122, 501/121, 119; 106/35

[56] References Cited

U.S. PATENT DOCUMENTS

| | | | |
|---|---|---|---|
| 1,546,833 | 7/1925 | Geiger | 501/89 |
| 3,361,583 | 1/1968 | Elarde et al. | 106/39 |
| 3,505,278 | 4/1970 | Elarde et al. | 260/37 |
| 3,549,393 | 12/1970 | Elarde et al. | 106/39 |
| 4,265,669 | 5/1981 | Starling et al. | 264/65 |
| 4,568,402 | 2/1986 | Ogawa et al. | 501/119 |
| 4,800,180 | 1/1989 | McAllister | 501/88 |
| 4,810,681 | 3/1989 | Hayakawa | 501/119 |

FOREIGN PATENT DOCUMENTS

WO88/08828 11/1988 World Int. Prop. O.

OTHER PUBLICATIONS

Introduction to Ceramics, 2nd Edition, W. D. Kingery et al., John Wiley & Sons, New York (1976), pp. 368-374.
Ceramic Bulletin, 43 (5) 383-389 (1964).
Ceramic Engineering & Science Proceedings, 6 (1-2) 41-56 (1985).

Primary Examiner—William R. Dixon, Jr.
Assistant Examiner—Melissa Bonner
Attorney, Agent, or Firm—Donald M. Sell; Walter N. Kirn; Lorraine R. Sherman

[57] ABSTRACT

A moldable composiion comprising a mixture of magnesia, alumina, and silicon carbide powders or agglomerates thereof, the powders having an overall average size of at most 5.0 micrometers, preferably an average size in the range of 0.2 to 2.0 micrometers, optionally a polymeric binder, optionally a fluxing agent, and optionally a plasticizer or lubricant which exhibits litle or no controlled dimensional stability upon being fired to a cordierite ceramic material in a novel process. The process involves incorporation of silicon carbide powder into the moldable composition and the reaction of this silicon carbide upon firing to produce silicon dioxide. The cordierite ceramic material is useful where the dimensions of a shaped or molded part must be preserved after firing, as, for example, in the preparation of dental articles or as a mold for casting metals.

32 Claims, 1 Drawing Sheet

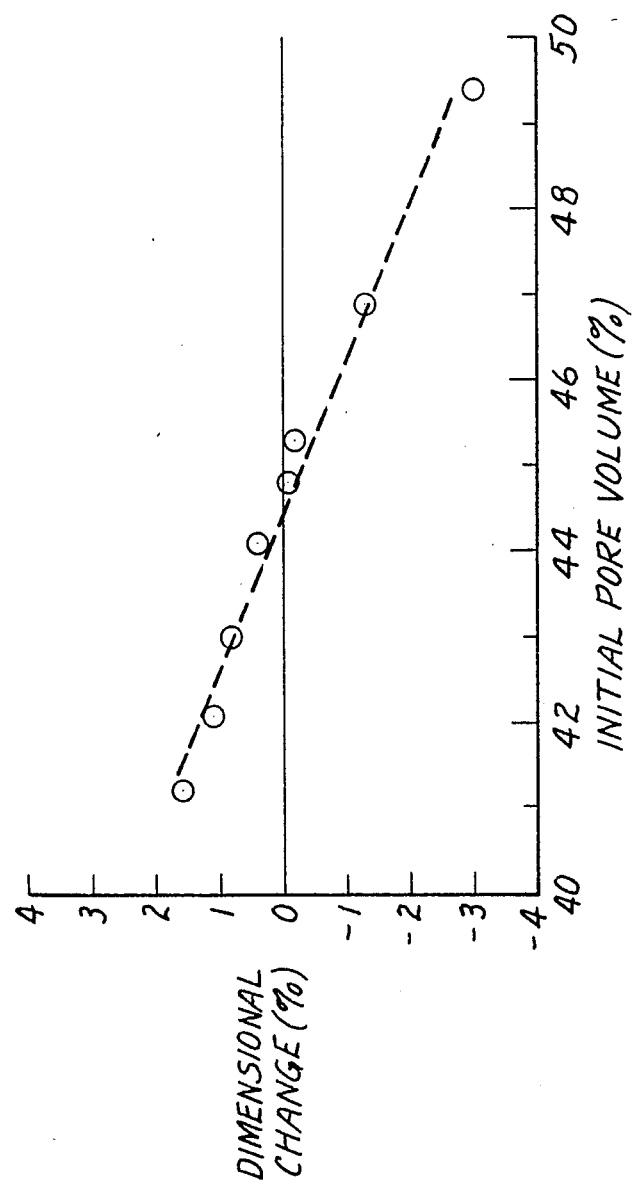

DIMENSIONALLY-CONTROLLED CERAMICS

FIELD OF THE INVENTION

This invention relates to a method of preparing cordierite-containing ceramics which exhibit controlled dimensional stability on firing. Precursor moldable compositions and composite structures are also disclosed.

BACKGROUND OF THE INVENTION

Porcelain is a polycrystalline ceramic body containing 10 to 40 volume percent of a vitreous second phase. It is usually white in color and is impermeable to liquids and gases. Cordierite is a type of porcelain which is a well known engineering ceramic.

Cordierite porcelain is typically formed from powder mixtures of Talc ($Mg_3Si_4O_{10}(OH)_2$) and Kaolin ($Al_2Si_2O_5(OH)_4$). Minor additions of different flux powders may also be included. These are chemicals which permit lowering of the firing temperature by causing a glass to form at lower temperatures. Typical additions would be the carbonates of barium, calcium, sodium, or potassium. The powders are formed into the desired shape by well known techniques such as dry-pressing, slip-casting, and extrusion. After drying and heating at 600 to 1000° C. to remove water and organics used in these forming operations, the unfired (green) body typically will have a pore volume in the range of 40-50%. This is the void space which exists between the powdered raw materials. When this body is heated (fired) to temperatures in the range of 1200-1450° C. the powders react with each other to form a fluid glass and solid crystallites of cordierite ($Mg_2Al_4Si_5O_{18}$). The glass exerts capillary forces on the crystallites which pulls them closer together into a more tightly packed arrangement, a process known as vitrification. During vitrification much of the void space originally present between the powdered reactant is eliminated causing the shaped body to shrink in size. The amount of shrinkage observed depends on the initial pore volume in the green body and to a lesser extent on the density difference between the reactants and the final product. The linear shrinkage is generally in the range of 15 to 20%. It is difficult to completely eliminate porosity during vitrification and the final body usually contains a pore volume of 2-7%. Because the pores are not interconnected the final porcelain is impermeable to gases and liquids.

In the conventional method of preparing a cordierite porcelain body the firing shrinkage is simply compensated for by increasing the size of the green body. In most cases this is a satisfactory solution. However in some applications, as in dental restorations, excessive shrinkage cannot be tolerated. Also, in some instances where large or complex shapes are required, as in heat exchange tubes, it is difficult to heat the green body in a uniform manner. Some portions of the part may reach the vitrification temperature and commence shrinkage before the rest of the body leading to warping or distortion of the part. In such cases a process for forming a cordierite porcelain without firing shrinkage would also be desirable.

An alternate means of forming cordierite ceramics consists of heating the powdered raw materials in a crucible until a molten glass is formed. The glass is molded into the desired shape while still molten. After the glass is cooled to form a solid object it is annealed at a temperature where cordierite crystals can form in the glass. Materials made by this process are referred to as glass-ceramics. Little or no shrinkage occurs in this process, but it requires processing molten glasses at high temperature during the melting and molding operations. (See, Introduction to Ceramics, 2d Edition, W. D. Kingery et al., John Wiley & Sons, New York (1976) 368-374).

Certain low-shrinkage ceramic porcelains are known. An article in the Ceramic Bulletin, 43(5) 383-389 (1964), described several low shrinkage porcelains. The reference discloses a system based on the decomposition of kyanite ($Al_2SiO_5$) to provide a mixture of mullite ($Al_6Si_2O_{13}$) and silica. The density changes associated with this reaction produced a volume expansion of 17.5%. This was insufficient to fill the voids present in the original powder compact with the result that a shrinkage of 7.6% was observed and the final material was only 89% dense.

U.S. Pat. No. 3,361,583 and U.S. Pat. No. 3,505,278 teach a water-resistant dense ceramic article wherein silicone resin is used as a molding agent. The resin fills the voids between the powdered materials. As the molded part is heated in air the silicone resin leaves behind a $SiO_2$ residue which partially fills the voids. U.S. Pat. No. 3,505,278 describes this as: "[The] invention comprises mixing a moldable silicone resin composition with a mixture of a major amount of any ceramic material which either will not vitrify or has a relatively high vitrification temperature, and a ceramic material having a low temperature of vitrification...". The powdered raw materials consist of a major component of ceramic material, preferably alumina, but which can include magnesia, zirconia, titania, thoria, beryllia, silica, carbon, and carbides of silicon, titanium, zirconium, chromium, tungsten, and molybdenum, and a second component, which has a lower fusion temperature than the first component, comprising a mineral silicate, silicone resin, and a plasticizer. It is noteworthy that the major component is essentially a nonreactive filler. In the final product this filler is bonded together by a glass which results from the reaction between the minor, low fusing, component and the residual silica from the silicone resin. Thus if a carbide was used as the major component the carbide would also be present in the final product. The silicone resin is the critical ingredient in achieving minimum shrinkage.

U.S. Pat. No. 3,549,393 also makes use of a silicone resin to minimize shrinkage. However in this case the expansion associated with the decomposition of kyanite is used to further reduce the firing shrinkage. Shrinkages less than 1% were obtained; no information on the final porosity was given.

A similar process is described in U.S. Pat. No. 4,265,669 and in an article in Ceramic Engineering and Science Proceedings, 6(1-2) 41-56 (1985). Again a silicone molding resin was used to partially fill the pores with $SiO_2$. An expansion producing reaction was also used to further minimize shrinkage, in this case the reaction between MgO and $Al_2O_3$ to form $MgAl_2O_4$. This reaction provides an expansion of only 7%, and additional expansion was apparently required to eliminate all shrinkage. This was achieved by raising the firing temperature after a closed pore structure had been obtained. Expansion of the gases trapped in the pores caused the ceramic to expand slightly and this compensated for some of the shrinkage.

U.S. Pat. No. 4,800,180 discloses a shaped article consisting essentially of a ceramic matrix having dispersed therein 5 to 30 weight percent silicon carbide, the silicon carbide having a primary particle size of less than 0.1 micrometer and a modulus of elasticity (E) value greater than 690 GPa. The precursor green article is prepared by a non-melt process comprising shaping a viscous concentrate of a mixture of a precursor sol into which ultrafine crystalline silicon carbide particles are dispersed. These articles can be dried to result in non-refractory articles. Subsequent heating and firing the shaped green articles provides refractory articles. There is no teaching to controlled shrinkage upon firing. Further, there is no disclosure to the use of magnesia as a matrix component or to preparing a cordierite material.

WO 88/08828 discloses a dental restoration comprising a light curing resin in the presence of various ceramic materials. There is no suggestion that silicon carbide can be used to control shrinkage of the fired product.

It is believed there is no prior art relating to the preparation of dimensionally controlled cordierite porcelains by conventional powder processing techniques.

SUMMARY OF THE INVENTION

Briefly, the present invention provides a moldable composition comprising:

a mixture of magnesia, alumina, and silicon carbide powders or agglomerates thereof having an overall average particle size of at most 5.0 micrometers, preferably an average size in the range of 0.2 to 2.0 micrometers, and optionally at least one of a fluxing agent, a polymeric binder, a plasticizer, a dispersant, and a coupling agent.

In another aspect, the present invention provides a method for preparing a ceramic article in which dimensional stability can be controlled during processing, the method comprising the steps of:

(a) at least one of mixing and reducing the particle size of magnesia, alumina, and silicon carbide powders or agglomerates thereof to obtain a powder having an average size of at most 5.0 micrometers, preferably an average size in the range of 0.2 to 2.0 micrometers, said mixing optionally taking place in the presence of at least one of a fluxing agent, binder, plasticizer, dispersant, or coupling agent, (b) forming the resulting mixture into a compact green body having the property of controlled dimensional stability during further processing, and (c) heating said green body in the presence of an oxygen-containing gas to provide a cordierite ceramic article.

In this application:

"ceramic" means inorganic nonmetallic material consolidated by the action of heat, such as metal and non-metal oxides;

"green" means an article which is unfired, that is, not in its consolidated ceramic form;

"controlled dimensional stability" means exhibiting linear expansion or linear contraction of at most 5 percent;

"crystalline" means having a characteristic X-ray or electron diffraction pattern;

"amorphous" means a material having a diffuse X-ray diffraction pattern without definite lines to indicate the presence of a crystalline component;

"firing" means a heat-treatment used to densify a powder compact;

"vitrification" means densification of a powder compact caused by the presence of a viscous liquid which forms during firing, where densification occurs principally by the action of capillary forces which pull the remaining solid particles together, and where the liquid is present in sufficient quantity to substantially fill the voids between the solids at the conclusion of the process; and "sintering" means densification of a powder compact during firing where the amount of liquid phase, if any, is not sufficient to substantially fill the pores at the conclusion of the process, and where densification is brought about either by solid state diffusion or by diffusion through the liquid phase which acts to change the shape of the individual particles and bring them into a more tightly packed and bonded arrangement.

The present invention provides a porcelain body comprising cordierite ($Mg_2Al_4Si_5O_{18}$) crystals bonded together by a magnesium aluminum silicate glass phase.

What this invention teaches that the background art has not taught is the preparation of cordierite ($Mg_2Al_4Si_5O_{18}$) ceramics which exhibit controlled dimensional stability upon firing. SiC replaces $SiO_2$ in the raw material formulation and is converted to $SiO_2$ during the firing process. The expansion which occurs as the SiC is oxidized to $SiO_2$ compensates for the shrinkage which normally occurs during firing. The material produced by this invention is white in color, impervious to gases and liquids and can be polished to a glossy finish. It has good mechanical strength, a low thermal expansion coefficient and thus excellent resistance to thermal shock. It is useful for high-temperature heat exchangers, electrical insulators with low dielectric loss, and as electronic substrates. The cordierite ceramic material is particularly useful as a dental restorative material, for example, as a dental prosthetic device. It is also useful as a mold for casting metal.

Preferably, the unfired moldable composition is free of added $SiO_2$. It may be present as an impurity in an amount less than 3 weight percent, preferably in an amount less than 2 weight percent in the moldable composition.

BRIEF DESCRIPTION OF DRAWING

In the accompanying drawing, FIG. 1 is a graph showing how the dimensional change during firing can be controlled by altering the initial pore volume of the unfired powder compact.

PREFERRED EMBODIMENTS OF THE INVENTION

Magnesia powders that can be used in the process, in moldable articles, and in composites of the present invention are commercially available, for example, from Martin Marietta Corporation. The magnesia powders generally have an average particle size in the range of 1.0 to 20 micrometers and a specific surface area of 1.0 to 25 $m^2/g$. Magnesia powder is present in the initial mixture in an amount in the range of 12 to 27 weight percent, preferably in the range of 18 to 24 weight percent of the total mixture of powders or agglomerates.

Alumina powders that can be used in the process and articles of the present invention are commercially available, for example, from Union Carbide Corporation. The powders generally have an average size in the range of 1.0 to 20 micrometers, and a specific surface area of 1.0 to 25 $m^2/g$. Alumina powder is present in the initial mixture in an amount in the range of 27 to 45 weight percent, preferably in the range of 31 to 37 weight percent of the total mixture of powders or agglomerates.

Silicon carbide powder is available, for example, from Lonza, Ltd., Basle, Switzerland. The particles generally have an average size in the range of 0.2 to 5.0 micrometers, and a specific surface area of 1.0 to 25 $m^2/g$. Silicon carbide is present in the initial mixture in an amount in the range of 37 to 51 weight percent, preferably 42 to 48 weight percent of the total mixture of powders or agglomerates. The modulus of elasticity of the silicon carbide is not critical. Articles of the invention can be provided from SiC with a modulus of elasticity of 690 GPa or less or with a modulus of elasticity greater than 690 GPa.

The average particle size of the powders in the final reactant mixture is less than 5 micrometers and preferably in the range of 0.2 to 2.0 micrometers. The initial powders can have much larger particle sizes provided that they are reduced to the required size range during the mixing and milling procedures used in preparing the reactant mixture. Commercial powders often contain large porous particles. These are composed of small fully dense primary particles which are bonded together. If the bonding forces are weak, the large particles are known as agglomerates. When the bonding forces are strong, the large particles are known as aggregates. The agglomerates and aggregates can usually be broken down to a particle size approaching that of the primary particle size quite readily by ball-milling, jet-milling, or sonicating. However, if the initial powder is composed of fully dense particles larger than 5 micrometers it will be much more difficult to achieve the desired size range in the reactant mixture. Therefore, although not absolutely necessary, the initial powders should have a primary particle size of less than 5 micrometers, preferably less than 2 micrometers. The specific surface area of a powder is inversely related to its primary particle size, and therefore an important characteristic of the initial powder. For best results the initial powder should have a specific surface area in the range of 1–25 $m^2/g$ which corresponds to a primary particle size range of roughly 0.1–2.0 micrometers. Powders with lower surface areas are difficult to mill into the preferred size range, while powders with higher surface areas are difficult to pack tightly together and tend to produce green bodies with higher initial pore volumes. This makes it more difficult to completely control dimensional stability during firing.

The initial mixture for providing the green article of the invention also optionally can comprise a fluxing agent to lower the firing temperature and expand the firing temperature range. Fluxing agents are well known in the art and include, for example, calcium oxide, barium carbonate, sodium carbonate, and calcium carbonate. Up to about 10 weight percent of fluxing agent can be added to the powdered reactants.

Additionally, the initial mixture for providing the green article of the invention can optionally comprise a polymeric binder in an amount in the range of 1 to 50 volume percent of the total composition. The polymeric binder provides green strength for handling purposes and can provide a moldable slip when necessary. The binder is capable of complete volatility upon heating in the range of 600 to 1000° C. Representative polymeric binders include polymeric alcohols, polyvinyl alcohols, polyvinyl acetals, polyolefin and halo-substituted polyolefins, and polyacrylates such as poly(ethylene glycol), poly(vinyl alcohol), poly(vinyl butyral), poly(ethylene), poly(vinyl chloride), and poly(methylmethacrylate); epoxide resins; paraffin waxes; etc. Silicone molding resins which leave a silica residue after heating can also be used; however, the amount of SiC used in the powder reactant mixture must be proportionately reduced to avoid an excess of silica in the final composition. If the green article is to be prepared by dry pressing, an amount of binder up to about 10 volume percent can be useful; preferably 3 to 5 volume percent is used. If injection or impression molding is to be used, in the range of 20 to 50 volume percent, preferably 35 to 45 volume percent, of binder can be used. If the binder in the moldable composition is cured, or rigidized (as on cooling or loss of solvent), a composite structure is provided that can be machined or otherwise processed to form a shaped article. Upon firing a shaped cordierite ceramic article is provided.

Preferred heat fugitive binders degrade without causing internal pressures (which promote internal fractures) on the powder compact. Preferably, during heating of a molded mixture of reactants, the chosen binder gradually degrades or decomposes at a low temperature <600° C.

Mixtures of organic thermoplastics and organic thermosets can be used as binders. The use of a mixture of thermoplastic and thermoset binder may be advantageous when large composite articles are prepared or when rapid binder removal is desired. In such cases, a step-wise burn-off of the binder is preferred in order to avoid a spontaneous exotherm of the binder which could generate internal pressure resulting in multiple internal fractures in the molded article. Such a step wise burn-off is carried out by heating the green molded article to two or more successive temperatures, those temperatures being the individual decomposition temperatures of the thermoplastic and thermoset portions of the binders. Alternatively, the thermoplastic portion of the binder may be substantially removed by solvent leaching followed by thermal degradation of the thermoset portion of the binder.

A further alternative binder system employs a diluent with the binder. The diluent volatilizes prior to any significant binder degradation and thus provides open passage for the thermal degradation products during burnoff, reducing or eliminating internal fractures in the molded article.

Examples of thermoplastic binders include paraffin, e.g., Eskar Wax ™ R-35 (Amoco Oil Co., Chicago, IL), a combination of paraffin with a low molecular weight polyethylene, mixtures containing oleic or stearic acids or lower alkyl esters thereof, e.g., polyethylene glycol distearate, average molecular weight of 400 (Emerest ™ 2642, Emery Chemicals, Cincinnati, OH) as well as other waxy and paraffinic substances having the softening and flow characteristics of paraffin.

Representative thermosetting binders which can be used in combination with thermoplastics include epoxy resins, e.g. diglycidyl ethers of bisphenol A such as 2,2-bis-[p-(2,3-epoxypropoxy)phenyl]propane, which can be used with appropriate curing catalysts. Care must be exercised so as not to thermally induce crosslinking during the mixing and molding steps when thermosetting binders are used.

Representative solvents which can be used for leaching out the thermoplastic portion of a thermoplastic and thermoset binder mixture are ketones such as acetone or methyl ethyl ketone, and aqueous solvents. Diluents for use with "diluted" binder systems include liquids which are good solvents for the uncured binder but poor solvents for the cured binder. The diluent should have a sufficiently high boiling point so that it does not boil away before curing or setting of the binder, and a sufficiently low boiling point so that the diluent volatilizes before the binder begins to thermally degrade. Preferred diluents are those which volatilize at temperatures of about 150° C. to 210° C., such as low molecular weight polyoxyglycols and light hydrocarbon oils.

A plasticizer to soften the binder and add flexibility to the green body optionally can be used in the mixture. These are well known in the art and include glycerine, butyl stearate, and dimethyl phthalate. Plasticizers can be used in an amount up to about 40 weight percent of the binder.

A dispersant can be used to improve the flow characteristics of the reactant powders in the polymer binder or casting suspensions. These are well known in the art and include fatty acids, natural fish oils, and synthetic surfactants. Dispersants can be used in amounts up to about 10 weight percent of the binder.

A coupling agent may be used to promote bonding or wetting of the polymeric binder to the ceramic reactant particles. In some instances a coupling agent will permit higher loadings of powdered reactants into the binder leading to lower initial pore volumes in the green article after binder removal. These are well known in the art and are commercially available and include, for example, vinyltrimethoxysilane, 3-glycidoxypropyltrimethoxysilane, and 3-methacryloxypropyltrimethoxysilane. Coupling agents can be used in amounts ranging up to 3 percent of the powdered reactant weight.

In the process of the present invention, the size reduction mixing and deagglomerating step can be accomplished, for example, by ball-milling the powders either dry or in the presence of non-solubilizing organic liquids such as alcohols or ketones, or the mixing can be done by means known in the art such as sonicating, high speed shear mixing, etc. It is preferable to use a combination of wet milling followed by dry milling. This provides a higher density combined with near zero shrinkage in the final ceramic material.

The forming step can by accomplished, for example, by pressing, slip casting, tape casting, injection molding, or impression molding, or by any other means known in the art, to provide any desired shape, such as a pellet, cube, polyhedron, flat sheet, etc. In some instances, it may be desirable to form the green body into a simple shape, such as a block, cylinder, or other rigidized green structure which may require curing (any of heat, light, and chemical curing), and then machine it into a more useful shape. This shaped green article can then be fired. The rigidized structure can have a pore volume in the range of 35 to 50 volume percent, preferably 40 to 45 volume percent, after removal of organics.

In the forming step, the green article is provided. The amount of shrinkage or expansion in the final ceramic product is determined by the pore volume in the green article after the removal of polymeric binder or other organics which may be present. These organics, as noted above, can be removed by heating the green shaped article in the range of 600 to 1000° C. to form a shaped green article with a uniform pore distribution. For low shrinkage or expansion the green article generally has a pore volume in the range of 35 to 50 volume percent, preferably 40 to 45 volume percent, after organics are removed. This can be accomplished by controlling the pressure applied during dry-pressing, through variations in the amount of organic binder or solvent present in the molding compound or casting slurry, by altering the particle size distribution of the reactant powder (broader distributions pack more densely), or by controlling the amount of powder flocculation in the molding compound or casting slurry with dispersants (flocculated powders will pack less densely). This range provides a residual porosity in the cordierite ceramic article of less than 10 volume percent, preferably in the range of 0 to 3 volume percent. The average pore size after firing is less than 10 micrometers, preferably less than 5 micrometers.

Because silica is less dense than silicon carbide, upon conversion of SiC to $SiO_2$ during the heating step of the process, a material of greater volume is provided. Silica (1) fills pores, and (2) accounts for some expansion in the article because silica is less dense than silicon carbide. The expansion compensates for shrinkage one would normally have when pores are eliminated, as in prior art processes.

In the heating step of the process, wherein the green article is converted to the cordierite ceramic article, the green body is heated slowly to about 600° C. This serves to eliminate most of any binder that is present without distorting or damaging the green body. The mass is then heated rapidly to about 1000° C. to reach temperatures where SiC will begin to oxidize. The material is further heated to slowly raise the temperature to a final temperature in the range of 1250 to 1450° C. to completely convert all SiC to $SiO_2$. At these temperatures, magnesia, alumina, and the resulting silica react to form cordierite and a liquid magnesium aluminum silicate glass. The material densifies by the process of vitrification or sintering. The article is then allowed to cool to room temperature to provide the shaped article of the invention.

The gas used during the heating step can be pure oxygen or any oxygen-containing gas, for example, air.

The ceramic cordierite material generally comprises in the range of 60 to 95 volume percent crystalline component, i.e. $Mg_2Al_4Si_5O_{18}$, and in the range of 5 to 40 volume percent of a glassy phase (amorphous alumina, magnesia, and silica, of varying composition).

The present invention provides a method of forming cordierite porcelain bodies which exhibit controlled dimensional stability during firing. The uniqueness of this invention lies in the use of SiC as a raw material. During firing the SiC is oxidized and converted to $SiO_2$. The expansion associated with this reaction offsets the shrinkage which normally occurs during firing.

The oxidation of SiC in air proceeds by the reaction:

$$SiC + 2O_2 \rightarrow SiO_2 + CO_2$$

Because of the difference in density between SiC (3.21 g/cc) and $SiO_2$ (2.19–2.65 g/cc) a net expansion ranging between 82 and 120 volume percent can be predicted. The density of the $SiO_2$ depends on the crystal structure which is formed; amorphous, cristobalite, etc., and this depends on oxidation temperature. Considering the large expansion associated with this reaction it is surprising that integrity of the ceramic body is maintained during firing.

The large expansion provided by this reaction compared to those reactions used in the prior art means that it is possible to achieve zero firing shrinkage without resorting to the use of silicone resins. This provides much greater flexibility in the choice of polymeric binders and molding agents. Also it is not necessary to employ the technique of pore expansion. The strength of a ceramic body is well known to depend on the number and size of the pores present. Any process which increases the size of these strength limiting flaws is therefore undesirable.

The attainment of zero-shrinkage using the oxidation of SiC depends on several factors. First, the amount of expansion required during firing will depend on the pore volume of the starting body and that of the final body. Conventional powder forming techniques used in the ceramic industry typically result in unfired (green) bodies with a pore volume in the range of 40 to 50% after removal of organics. For many applications a body which is impermeable to gases and liquids will be desirable. This generally requires that the pore volume be reduced to less than 7%. At this level of porosity, remaining pores are no longer interconnected, but are isolated from each other. Assuming an initial pore volume of 40% and a final pore volume of 6%, a solids expansion of about 60% is required.

The actual expansion which can be achieved during firing depends on the composition of the ceramic. In a porcelain body, $SiO_2$ is only one component. The amount of $SiO_2$ in the ceramic composition will therefore limit the amount of SiC which can be used in the raw material formulation. This in turn will limit the amount of expansion which can be obtained through oxidation of the SiC. The $SiO_2$ formed by oxidation will react with the other raw materials to form the final ceramic. The volume change associated with this secondary reaction must also be considered.

Pure cordierite is very difficult to process into a dense ceramic. It melts congruently at 1460° C.; that is, it melts to form 100% liquid. This precludes densification by vitrification which requires a mixture of about 30 volume percent liquid and 70 volume percent solids. Instead, densification must occur by the more difficult process of solid state sintering. However, if the composition of the cordierite is enriched with one or more of the basic components: MgO, $Al_2O_3$, or $SiO_2$, then partial melting can be obtained at temperatures below 1460° C. and densification can occur by vitrification. Pure cordierite contains 13.8 wt% MgO, 34.9 wt% $Al_2O_3$, and 51.3 wt% $SiO_2$, but commercial cordierite ceramics have somewhat different ratios of these ingredients. Typical compositions for cordierite ceramics are in the composition range:
  10–22 wt percent MgO,
  22–38 wt percent $Al_2O_3$,
  48–61 wt percent $SiO_2$.
Careful control of the composition and firing temperature are required to form the proper amount of liquid phase during firing. We have found that the process of this invention produces excellent results at the composition: 17 wt% MgO, 28 wt% $Al_2O_3$, and 55 wt% $SiO_2$. A preferred range surrounding this composition would encompass: 15–19 wt% MgO, 26–30 wt% $Al_2O_3$, and 53–57 wt% $SiO_2$.

Cordierite compositions which utilize SiC as a source of $SiO_2$ provide a volume increase ranging from 65 to 72 percent depending on the silica content. Zero-shrinkage can be predicted for these compositions if the initial pore volume of the powder compact is in the range of 40% to 46% and the final porosity of the ceramic is in the range of 0% to 7%.

In addition to the basic components for cordierite, small amounts of other oxides are often added as fluxing agents in an amount up to 10 weight percent of the powdered components. These lower the firing temperature by reducing the temperature at which liquid forms. Some fluxing agents commonly used are BaO, CaO, $Na_2O$, and $K_2O$ and carbonates of sodium barium, and calcium. They are generally added to the raw materials batch as powdered carbonates which decompose on heating to provide the desired oxide flux.

The vitrification temperature is very important to the present invention. SiC must be completely oxidized to $SiO_2$ before the vitrification process closes off pore channels to the interior of the body. If pore channels are closed off too soon, $O_2$ cannot reach the SiC and oxidation will cease. The time and temperature required to complete oxidation of the SiC will depend on the particle size of SiC. Practical firing schedules require that the average particle size of the SiC be less than 5 micrometers and more preferably less than 2 micrometers.

Size of the ceramic body is also an important consideration. Oxidation of SiC will occur more readily at the surface of a powder compact. If reaction at the surface gets too far ahead of that at the interior, the difference in expansion can produce cracking. Therefore, larger bodies require slower heating rates in the temperature range where oxidation occurs, i.e., about 1000–1400° C.

Where materials are densified by the process of vitrification it is normal to find 2–7 volume percent porosity in the final ceramic. This is due to entrapment of gases from the furnace atmosphere in voids between particles. Once the ceramic densifies to the point where pores are isolated and no longer interconnected there is no free path for escape of these gases. Vines, et al. (J. Am. Ceram. Soc., 41(8) 304 305, 1958) have described this phenomenon and use of vacuum firing or helium atmosphere firing to reduce this residual porosity in other porcelain. These techniques can be applied to cordierite ceramics of this invention provided that provisions are made to fully oxidize the SiC prior to the application of a vacuum or helium atmosphere. Also, in order to be effective the vacuum or helium atmosphere must be applied before a closed pore structure forms in the fired body. One approach which can be used is to prefire the powder compact in an oxidizing atmosphere. The time-temperature profile is adjusted to provide for complete oxidation of SiC, but limited to avoid formation of a closed pore structure. A second firing using the vacuum or helium atmosphere techniques described in the reference by Vines, et al. can then be applied to complete densification.

It will be appreciated that many different modifications of the chemical composition, SiC particle size, and firing schedule may produce a workable system. It is possible to compensate for an alteration to one or more of the variables specified in the examples by changing the other variables. It will also be obvious to combine the use of SiC as an expansion aid with other techniques used to reduce firing shrinkage; for example, silicone molding resins or pore expansion during firing.

This invention will be especially useful for cases in which the dimensions of a molded or otherwise shaped part must be preserved after firing; for example, in preparing dental restorations or molds, for example, for casting molten metals. The invention may be used to produce a machinable ceramic-polymer composite which can be fired to produce cordierite ceramic articles with no change in dimension, for example, electrical insulators or electronic substrates. The invention may also be useful for reducing dimensional distortions caused by firing shrinkage in large or complex shapes such as heat exchanger tubes or parts for automotive engines. The cordierite ceramic is a colorless, partially translucent material. It can be polished to resemble tooth enamel. The material is impervious to liquids, solids, and gases, is mechanically strong, has good wear-resistance, and low thermal expansion.

In some applications a small amount of shrinkage or expansion may be desirable. For example, in preparing a dental inlay a slight shrinkage may be desirable to provide space for adhesive used to bond the inlay to the tooth. A dental cap or crown which fits over the natural tooth might require a slight expansion for the same purpose. The present invention can satisfy these requirements with careful manipulation of the processing conditions.

In addition, the present invention provides a useful material for a dental substrate such as a crown core which can be coated with a different orally aesthetic material.

Objects and advantages of this invention are further illustrated by the following examples, but the particular materials and amounts thereof recited in these examples, as well as other conditions and details, should not be construed to unduly limit this invention. In the Examples the following abbreviations are used: initial thickness (t), initial and final pore volumes after removal of organics (PVi and PVf), percent linear shrinkage/expansion or dimensional stability (DS) observed after firing, heating rate (HR), soak time (ST), and pressure (P) in mPa (psi).

EXAMPLE 1

The following materials were ball-milled together in ethanol for 24 hours using a 1 liter porcelain jar (Rolex TM Size 00, Norton Company, Akron, OH) and 1200 g of high-alumina media (Burundum TM 6.4 mm rods, Norton Company, Akron, OH):

12.48 g MgO, 4678 TM —Merck & Co., Inc., Rahway, NJ (average particle size 16.0 micrometers specific surface area 24 m$^2$/g)

20.58 g Al$_2$O$_3$, Linde A. TM —Union Carbide Corp., Indianapolis, IN (average particle size 15.0 micrometers, specific surface area 10–18 m$^2$/g)

26.94 g SiC, UF-15 TM —Lonza, Ltd., Basle, Switzerland (0.7 micrometer average particle size, specific surface area 15 m$^2$/g)

3.00 g polyethylene glycol, Carbowax 4000 TM —Union Carbide Corp., NY 3.00 g stearic Acid, 2216 TM —Mallinckrodt, Paris, KY The polyethylene glycol and stearic acid served as binders and lubricants in a subsequent pressing operation. The milling jar was rotated at 60 rpm.

After milling, the powder/ethanol slurry was slowly stirred on a hot plate at a low setting to evaporate the ethanol. The dried powder cake was then crushed and screened through a 60 mesh sieve. This powder was dry-pressed into small pellets (12 mm diameter × 2 mm high) at a pressure of 1400 MPa (20,000 psi).

The pellets were fired in air and then cooled according to the following schedule:

| | | | |
|---|---|---|---|
| 25 | → | 100° C. | 1 hour |
| 100 | → | 200° C. | 4 hours |
| 200 | → | 500° C. | 4 hours |
| 500 | → | 1000° C. | 1 hour |
| 1000 | → | 1400° C. | 4 hours |
| | 1400° C. | | 1 hour |
| 1400 | → | 25° C. | 1 hour |

After firing, the pellets were white, with a glossy (vitreous) appearance. No cracks were visible. Table 1 shows the initial thickness (t) of the pellet, the initial and final pore volumes (PVi and PVf), and the percent linear shrinkage/expansion or dimensional stability (DS) observed after firing. The heating rate (HR) from 1000 to 1400° C. and the soak time (ST) at 1400° C. are also shown to facilitate comparison with the other examples.

TABLE 1

| | Firing Conditions and Results | | | | | |
|---|---|---|---|---|---|---|
| Example No. | HR(°C./hr) | ST(hr) | t(mm) | PVi(%) | PVf(%) | DS*(%) |
| 1 | 100 | 1 | 2 | 53.0 | 2.0 | −5.4 |

*a minus sign indicates shrinkage, a plus sign expansion

A polished cross section of a fired pellet was featureless when observed under a microscope except for pores which were isolated from each other and which were typically 5 micrometers or less in diameter. The only crystalline phase identified by X-ray diffraction was alpha-cordierite.

EXAMPLE 2

The procedures used in this example were similar to those used in Example 1, except that MgO and Al$_2$O$_3$ powders with lower specific surface areas were used in the reactant formulation. Also, pellets of different thickness were prepared.

The following components were ball-milled together for 24 hours in ethanol using a 1 liter porcelain jar (Rolex Size 00) and 1200 g of high-alumina media (Burundum 6.4 mm rods:

12.48 g MgO, Magchem 10 325 TM, Martin Marietta Corp., Hunt Valley, MD (10 micrometers average particle size, specific surface area <1 m$^2$/g)

20.58 g Linde C TM —Union Carbide Corp., Indianapolis, IN (15 micrometers average particle size, specific surface area 1.8–4 m$^2$/g)

26.94 g SiC (UF-15, —0.7 micrometers average particle size, specific surface area 15 m$^2$/g)

After milling, the powder/ethanol slurry was slowly stirred on a hot plate at a low setting to evaporate the ethanol. Batches of powder weighing 5–10 g were mixed with polyethylene glycol (Carbowax 200 TM —Union Carbide Corp., NY) using a mortar and pestle with ethanol as a solvent. The ethanol slowly evaporated during mixing to form a free flowing powder. This was later screened through a 60 mesh sieve Pellets were prepared from the screened powder as described in Example 1. Four samples of pressed pellets were fired according to the schedule below:

| | | | |
|---|---|---|---|
| 25 | → | 500° C. | 2.5 hours |

-continued

| | | | |
|---|---|---|---|
| 500 | → | 1000° C. | 1.0 hour |
| 1000 | → | 1400° C. | 4.0–8.0 hours |
| | 1400° C. | | 1.0–10.0 hours |
| 1400 | → | 25° C. | 1.0 hour |

The heating rate between 1000 to 1400° C. was individually varied and different soak times at 1400° C. were used. These are shown in Table 2 along with the results:

TABLE 2

| | Effect of Heating Schedule on the Densification | | | | | |
|---|---|---|---|---|---|---|
| Example No. | HR(°C./hr) | ST(hr) | t(mm) | PVi(%) | PVf(%) | DS*(%) |
| 2(a) | 100 | 1 | 2 | 50.0 | 16.3 | −0.5 |
| 2(b) | 100 | 10 | 2 | 50.0 | 2.4 | −3.5 |
| 2(c) | 100 | 10 | 6 | 47.2 | unreacted | |
| 2(d) | 50 | 10 | 6 | 47.2 | 1.0 | −4.0 |

*a minus sign indicates shrinkage, a plus sign expansion

Comparing the results of Example 2(a) to those of Example 1 it can be seen that substitution of lower surface area MgO and Al$_2$O$_3$ (coarser crystallite size) resulted in a lower initial pore volume. However, it also reduced densification when the sample was fired following the same schedule. The final ceramic retained 16.3% pores after firing and was still permeable to liquids and gases.

Slower densification of this powder formulation was compensated for by increasing the soak time to 10 hr in Example 2(b). In this case only 2.4% of porosity remained in the fired ceramic and it was impermeable. Lower initial pore volume of this powder formulation compared to that of the sample of Example 1 is reflected in a lower shrinkage value (DS) after firing.

Example 2(c) shows the results for a thicker pellet fired with the schedule from 2(b). Unreacted SiC remained in the interior of this pellet. This was readily apparent from the dark gray color of the SiC. When the heating rate between 1000–1400° C. was reduced the SiC was fully reacted and a white, impermeable material with low firing shrinkage was obtained, similar to Example 2(b).

EXAMPLE 3

The following ingredients were dry ball-milled together for 24 hr using a 1 liter polyethylene jar and 1200 g of Burundum high-alumina grinding media (6.4 mm rods):

12.48 g MgO (Magchem 10 325s)
20.58 g Al$_2$O$_3$ (Linde C)
26.94 g SiC (UF-15)
0.60 g triethanolamine, Aldrich Chemical Company, Milwaukee, WI Triethanolamine is a grinding aid which was added to help prevent packing of fine powders on jar walls during milling. It also served as a binder during subsequent dry-pressing of the milled powder. The mill jar was rotated at 96 rpm.

The milled powder was screened through a 60 mesh sieve, then dry-pressed into pellets (12 mm diameter × 6–8 mm high) at a pressure of 140 Mpa (20,000 psi).

The pressed pellets were fired according to the schedule of Example 2. The heating rate between 1000 to 1400° C. was varied. Soak time at 1400° C. was 10 hr. Table 3 indicates the heating rate for two different samples and the results obtained:

TABLE 3

| | Effect of Heating Schedule on the Densification | | | | | |
|---|---|---|---|---|---|---|
| Example No. | HR(°C./hr) | ST(hr) | t(mm) | PVi(%) | PVf(%) | DS*(%) |
| 3(a) | 50 | 10 | 6 | 10.5 | unreacted | |
| 3(b) | 33 | 10 | 8 | 40.5 | 6.5% | +2.5% |

*a minus sign indicates shrinkage, a plus sign expansion

Dry-milling of powders generally produces a broader distribution of milled particles with a higher average particle size compared to wet-milling. Because of this a dry-milled powder can often be pressed to a higher density. This is apparent from the lower initial pore volumes observed in this example compared to those in earlier examples where the reactants were wet-milled. Failure of the SiC in Example 3(a) to fully react when fired on the same schedule as used for Example 2(d) suggests a coarser particle size. When the heating rate between 1000–1400° C. was lowered in Example 3(b) the SiC was fully reacted and densification proceeded normally. In this case, low initial pore volume obtained by dry-milling made it possible to actually achieve a small net expansion during firing while still producing an impervious ceramic body.

EXAMPLE 4

The procedures of Example 3 were followed except that pressure applied during dry-pressing was varied from 140 MPa (20,000 psi) down to 17.5 MPa (2500 psi). This yielded pellets with different initial pore volumes. The firing schedule is shown below:

| | | | |
|---|---|---|---|
| 25 | → | 500° C. | 2.5 hrs |
| 500 | → | 1000° C. | 1 hr |
| 1000 | → | 1425° C. | 13 hrs (33° C./hr) |
| 1425 | → | 25° C. | 2 hrs |

The higher final temperature allowed the 10 hr soak period to be eliminated. Table 4 shows the effect of initial pore volume on dimensional stability:

TABLE 4

| | Effect of Initial Pore Volume on Densification | | | | | | |
|---|---|---|---|---|---|---|---|
| Example No. | P | HR(°C./hr) | ST(hr) | t(mm) | PVi(%) | PVf(%) | DS*(%) |
| 4(a) | 140 (20,000) | 33 | 0 | 6 | 41.2 | 6.1 | +1.6 |

TABLE 4-continued

Effect of Initial Pore Volume on Densification

| Example No. | P | HR(°C./hr) | ST(hr) | t(mm) | PVi(%) | PVf(%) | DS*(%) |
| --- | --- | --- | --- | --- | --- | --- | --- |
| 4(b) | 100 (15,000) | 33 | 0 | 6 | 42.1 | 4.3 | +1.1 |
| 4(c) | 70 (10,000) | 33 | 0 | 6 | 43.0 | 6.3 | +0.8 |
| 4(d) | 52 (7,500) | 33 | 0 | 6 | 44.1 | 6.7 | +0.4 |
| 4(e) | 48 (7,000) | 33 | 0 | 6 | 44.8 | 6.7 | −0.1 |
| 4(f) | 45 (6,500) | 33 | 0 | 6 | 45.3 | 7.1 | −0.2 |
| 4(g) | 34 (5,000) | 33 | 0 | 6 | 46.9 | 6.6 | −1.3 |
| 4(h) | 17 (2,500) | 33 | 0 | 6 | 49.4 | 6.6 | −3.0 |

*a minus sign indicates shrinkage, a plus sign expansion

The results from this example show that with a slow heating rate of 33° C./hr and a slightly higher final temperature it is possible to eliminate the 10 hr soak period for this reactant formulation. Further, this example shows that the dimensional stability can be varied around the zero point by control of initial pore volume, which was in turn controlled by pressure applied during dry-pressing. The drawing shows a graph of the initial pore volume and dimensional stability data from Table 4. A linear relationship exists between these two quantities which provides a means of adjusting the dimensional stability which is desired for a given process.

EXAMPLE 5

The procedures used in this example were the same as those employed in Example 2, but in this case SiC with a coarser crystallite size was substituted for Lonza UF-15. SiC used in this example was Type GC 8000 ™, Fujimi Kenmazai Kogyo Co., Nagova, Japan (1.6 μm average particle size). In Example 5(b) calcium acetate was added to the milled ingredients along with polyethylene glycol. The amount of calcium acetate was sufficient to add 2 wt percent CaO to the reactants. The firing schedule of Example 2(b) was used in this example. The results are reported in Table 5, below:

TABLE 5

Effect of CaO on the Densification

| Example No. | HR(°C./hr) | ST(hr) | t(mm) | PVi(%) | PVf(%) | DS*(%) |
| --- | --- | --- | --- | --- | --- | --- |
| 5(a) | 100 | 10 | 2 | 49.5 | 19.7 | −0.9% |
| 5(b) | 100 | 10 | 2 | 46.8 | 5.4 | −2.8 |

*a minus sign indicates shrinkage, a plus sign expansion

Substitution of coarser SiC limited the densification process as can be seen by comparing the final pore volume of Example 5(a) to that obtained in Example 2(b) which utilizes finer SiC. The beneficial effect that fluxing agents such as CaO can have on the densification behavior of these materials is illustrated by Example 5(b). Addition of CaO reduced the final pore volume from 19.7 to 5.4%.

EXAMPLE 6

Initial powders and procedures of Example 2 were used to prepare a slurry of reactants that had been wet-milled in ethanol. After milling, 5 weight percent polyethylene glycol (molecular weight 200—Aldrich Chemical Company, Inc., Milwaukee, WI) and 1 weight percent stearic acid (2216—Mallinckrodt, Paris, KY) were added to the powder/ethanol slurry and the mixture was slowly stirred on a hot plate at a low setting to evaporate the ethanol.

The powder was then dry ball-milled for 36 hours using a 1 liter polyethylene jar and 1200 g of Burundum high-alumina grinding media (6.4 mm rods). The mill jar was rotated at 96 rpm.

The milled powder was screened through a 60 mesh sieve. Pellets were dry-pressed at 140 MPa (20,000 psi). These were sintered using the firing schedule of Example 4.

TABLE 6

Firing Conditions and Results

| Example No. | HR(°C./hr) | ST(hr) | t(mm) | PVi(%) | PVf(%) | DS(%) |
| --- | --- | --- | --- | --- | --- | --- |
| 6 | 33 | 0 | 6 | 41.9 | 2.3 | 0.0 |

The data of Table 6 show that dry-milling the reactant mixture for 36 hours following wet-milling decreases the initial pore volume to the point at which zero % linear dimensional change can be obtained. This is done while maintaining the better densification properties of the wet-milled powder.

The combination of wet-milling followed by dry-milling permitted dimensional stability to be obtained with low residual porosity. The additional dry-milling step reduced the initial pore volume of the pressed discs. This can be seen by comparing the PVi value from this Example, 41.9%, with that in Example 2(d) where the same powder formulation was only wet-milled, 47.2%. The lower initial pore volume means that less expansion was required to compensate for firing shrinkage which made it easier to attain dimensional stability. While dimensional stability was also obtained from powders which were only dry-milled, these produced more residual porosity in the final ceramic. This can be seen by comparing the PVf value from this Example, 2.3%, with that from Example 4(e) where dry-milling alone was used, 6.7%.

EXAMPLE 7

The following ingredients were ball-milled together for 24 hours in ethanol using a 1 liter porcelain jar (Rolex Size 00) and 1200 g of high-alumina media (Burundum 6.4 mm rods):

26.00 g MgO (Magchem 10 325s),
42.87 g $Al_2O_3$ (Linde C)
56.13 g SiC (UF-15)

After milling the powder/ethanol slurry was slowly stirred on a hot plate at a low setting to evaporate the ethanol. Next, the powder was dry ball-milled for 36 hours using a 1-liter polyethylene jar and 1200 g of Burundum grinding media (6.4 mm rods). The mill jar was rotated at 96 rpm.

18.6 Weight percent of a polymethylmethacrylate molding resin (Transoptic ™, Buehler No. 20-3400-080, Buehler Co., Lake Bluff, IL) was mixed into the reactant powder by ball-milling these together with toluene for 30 minutes. The resin was dissolved in the toluene during milling and was uniformly distributed throughout the reactant powder. The milling was done in a 1-liter porcelain jar (Rolex, size 00) with 1200 g of Burundum grinding media (6.4 mm rods). The jar was rotated at 60 rpm. The resulting slurry was stirred on a hot plate at a low setting until most of the toluene was evaporated. Then the slurry was removed from the hot plate and spread on a sheet of polyethylene to finish drying. This produced a thin layer of dryed material which was crushed and screened through a 60 mesh sieve to produce a powder suitable for compression molding.

Approximately 3 grams of the above powder was compression molded in a 1.3 cm (0.5 in.) diameter cylindrical die A pressure of 140 MPa (20,000 psi) was applied to the die. The temperature was raised to 140° C. and held there 15 minutes while under constant pressure. The die was allowed to cool to below 60° C. before the pressure was relieved and the pellet was removed from the die.

The molded pellet was machined into a shape approximating a dental inlay using carbide tooling. A male counterpart was machined from aluminum and optical micrographs were taken of the inlay on the male to evaluate the fit before and after firing.

The molding resin was removed from the inlay by thermal decomposition in nitrogen according to the following schedule:

| 25  | →       | 200° C. | 1.0 hour   |
|-----|---------|---------|------------|
| 200 | →       | 400° C. | 10.0 hours |
| 400 | °C. soak|         | 0.5 hours  |
| 400 | →       | 25° C.  | 2.0 hours  |

After the resin burnout the machined inlay was sintered in air using the firing schedule of Example 4.

The fired inlay was white in color. The residual pore volume, determined from density measurements, was 2.2%. Comparison of the optical photographs before and after firing indicated a linear shrinkage during firing of about 1%. There was no visible warping or distortion. Only a minor adjustment would be required by a dentist to create a perfect fit.

Various modifications and alterations of this invention will become apparent to those skilled in the art without departing from the scope and spirit of this invention, and it should be understood that this invention is not to be unduly limited to the illustrative embodiments set forth herein.

I claim:

1. A moldable unfired composition comprising a mixture of 12 to 27 weight percent magnesia, 27 to 45 weight percent alumina, and 37 to 51 weight percent silicon carbide powders of agglomerates thereof, said magnesia, alumina, and silicon carbide powders and agglomerates having an overall average particle size of at most 5.0 micrometers.

2. The moldable composition according to claim 1 wherein said magnesia is present in an amount in the range of 18 to 24 weight percent.

3. The moldable composition according to claim 1 wherein said alumina is present in an amount in the range of 31 to 37 weight percent.

4. The moldable composition according to claim 1 wherein said silicon carbide is present in an amount in the range of 42 to 48 weight percent.

5. The moldable composition according to claim 1, further comprising a chemically effective amount of at least one of a fluxing agent, a polymeric binder, a plasticizer, a dispersant, and a coupling agent.

6. The moldable composition according to claim 1 wherein said composition has been molded to provide an article having a pore volume in the range of 35 to 50 volume percent after removal of organics.

7. The moldable composition according to claim 6 wherein said pore volume is in the range of 40 to 45 volume percent after removal of organics.

8. The moldable composition according to claim 5 wherein said fluxing agent is present in the range of more than zero and up to 10 weight percent of the powdered components.

9. The moldable composition according to claim 5 wherein said polymeric binder is present in an amount in the range of 1 to 50 volume percent.

10. The moldable composition according to claim 5 wherein said plasticizer is present in the range of more than zero and up to 40 percent of the polymeric binder.

11. The moldable composition according to claim 1 wherein said powders and agglomerates have an overall average particle size in the range of 0.2 to 2.0 micrometers.

12. A composite rigidized green structure comprising a mixture of 12 to 27 weight percent magnesia, 27 to 45 weight percent alumina, and 37 to 51 weight percent silicon carbide powders or agglomerates thereof, said magnesia, alumina, and silicon carbide powders and agglomerates having an overall average particle size of at most 5.0 micrometer; and a polymer binder which is present in an amount in the range of 1 to 50 volume percent.

13. The composite structure according to claim 12 wherein said structure has a pore volume in the range of 35 to 50 volume percent after removal of organics.

14. The composite structure according to claim 13 wherein said pore volume is in the range of 40 to 45 volume percent after removal of organics.

15. A method comprising the steps of:
 (a) mixing and optionally reducing the particle size of magnesia, alumina, and silicon carbide powders or agglomerates thereof to obtain a powder having an overall average particle size of at most 5.0 micrometers, the mixture optionally comprising a chemically effective amount of at least one of a fluxing agent, binder, plasticate, dispersant, and coupling agent,
 (b) forming the resulting mixture into a compact green body having the property of controlled dimensional stability during further processing.

16. The method according to claim 15 wherein said mixing and reducing of particle size is accomplished by a combination of wet and dry milling.

17. The method according to claim 15 further comprising the step of heating said green body in the presence of an oxygen-containing gas at a temperature in the range of 1250 to 1450° C. for a time sufficient to convert all silicon carbide to silica and to convert magnesia, alumina, and silica into a cordierite-containing ceramic article.

18. The method according to claim 17 wherein said heating is provided in a two step process wherein prefiring takes place in an oxidizing atmosphere for a time sufficient to convert all SiC to SiO$_2$, and then firing takes place in a vacuum or helium atmosphere to complete densification, said pre-firing and firing steps taking place at a temperature in the range of 1250 to 1450° C.

19. A cordierite ceramic article provided by the method according to claim 17 wherein magnesia is present in the range of 10 to 22 weight percent, alumina is present in the range of 22 to 38 weight percent and silica is present in the range of 48 to 61 weight percent, said article being a dental article.

20. The cordierite ceramic article according to claim 19 which has residual porosity of less than 10 volume percent.

21. The cordierite ceramic article according to claim 20 has residual porosity in the range of 0 to 3 volume percent.

22. The cordierite ceramic article according to claim 19 which is a dental prosthetic device.

23. The cordierite ceramic article according to claim 19 which is a casting mold.

24. A moldable unfired composition comprising a mixture of magnesia, alumina, and silicon carbide powders or agglomerates thereof, said magnesia, alumina, and silicon carbide powders or agglomerates having an overall average particle size of at most 5.0 micrometers, said components being present in amounts sufficient to provide a cordierite article after firing, the composition exhibiting controlled dimensional stability upon firing such that there is linear expansion or linear contraction of at most 5 percent.

25. The moldable composition according to claim 24 further comprising a chemically effective amount of at least one of a fluxing agent, a polymeric binder, a plasticizer, a dispersant, and a coupling agent.

26. A dental restorative material comprising the composition according to claim 1 which has been fired to provide a cordierite-containing ceramic.

27. The dental restorative material according to claim 26 which is a dental prosthetic device.

28. A mold for casting metal comprising the composition according to claim 1 which has been fired to provide a cordierite-containing ceramic.

29. A dental article comprising the composite structure according to claim 12 which has been fired and then machined to provide a cordierite-containing dental article.

30. The moldable composition according to claim 5 wherein said dispersant is present in the range of more than zero and up to 10 weight percent of said binder.

31. The moldable composition according to claim 5 wherein said coupling agent is present in the range of more than zero and up to 3 percent of the powdered reactant weight.

32. A method of providing a dental prosthetic device comprising the steps:
(a) mixing and optionally reducing the particle size of magnesia, alumina, and silicon carbide powders or agglomerates thereof to obtain a powder having an overall average particle size of at most 5.0 micrometers, the mixture optionally comprising a chemically effective amount of at least one of a fluxing agent, binder, plasticizer, dispersant and coupling agent,
(b) forming the resulting mixture into a compact green body having the desired dental prosthetic shape, and
(c) heating said green body in the presence of an oxygen-containing gas at a temperature in the range of 1250 to 1450° C. for a time sufficient to completely convert all silicon carbide to silica and to provide the desired cordierite-containing dental prosthetic device.

* * * * *

UNITED STATES PATENT AND TRADEMARK OFFICE
CERTIFICATE OF CORRECTION

PATENT NO. : 4,957,554

DATED : September 18, 1990

INVENTOR(S) : James P. Mathers

It is certified that error appears in the above-identified patent and that said Letters Patent is hereby corrected as shown below:

Col. 10, line 7, after the word "sodium", kindly insert -- , --.

Col. 12, line 48, "10 325" should read -- 10 325s$^{TM}$ --.

Col. 12, line 64, after the word "sieve" kindly insert -- . --

Col. 14, Table 3, PV(%) for Example No. 3(a), kindly delete "10.5" and insert therefor -- 40.5 --.

Col. 18, line 32, after "40" kindly insert -- weight --.

Signed and Sealed this

Third Day of November, 1992

Attest:

DOUGLAS B. COMER

Attesting Officer

Acting Commissioner of Patents and Trademarks